UNITED STATES PATENT OFFICE.

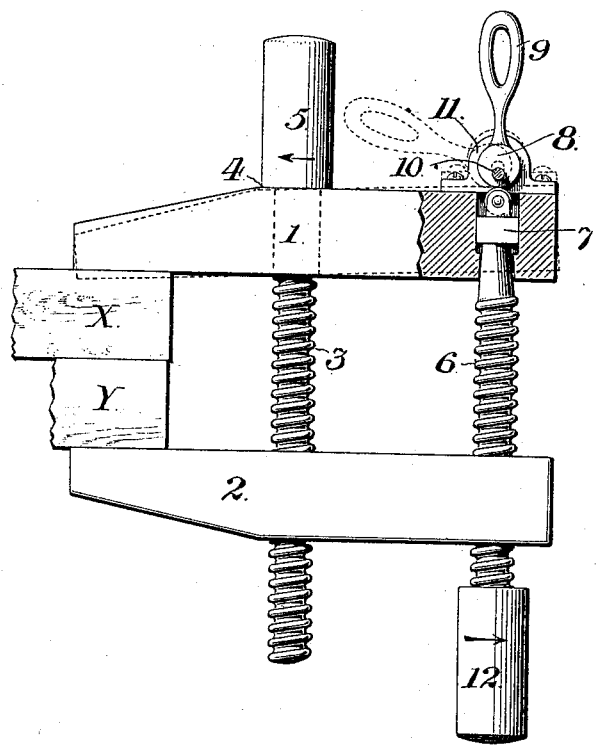

JOHN G. FROELICH, OF PHILADELPHIA, PENNSYLVANIA.

CLAMPING MECHANISM.

SPECIFICATION forming part of Letters Patent No. 423,992, dated March 25, 1890.

Application filed November 18, 1889. Serial No. 330,791. (No model.)

*To all whom it may concern:*

Be it known that I, JOHN G. FROELICH, a citizen of the United States, residing at Philadelphia, in the county of Philadelphia and State of Pennsylvania, have invented certain new and useful Improvements in Clamping Mechanisms; and I do hereby declare the following to be a sufficiently full, clear, and exact description thereof as to enable others skilled in the art to make and use the said invention.

This invention relates to screw-clamps used by mechanics in holding parts of work together during the operations of fitting, gluing, and veneering, and has for its object the easier and more expeditious working of such implements, with less wear upon their working parts, and consequently with an increased durability.

In the use of the screw-clamps as usually practiced by cabinet-makers two screws of equal pitch are employed, one passing through the mid-length of two blocks or jaws and screwing through one of them serves to draw the two blocks toward each other, and the other screw fitting through a nut formed in the end of one block rests in a cavity in the other, and serves, by forcing these ends of the blocks apart, to force the other ends of the blocks together, and so procures a firm grasp on the work. There is very little resistance or friction experienced in the first application of the clamp; but in tightening up the end screw there is a great deal of force required, much of which is expended in the friction of turning the screw. This has been measurably remedied by the application of a cam in some clamps against which the end of the outer screw pressed, which cam, being operated after the screws were adjusted to the work, exerted a final clamping-pressure, with less friction between the parts than was incident to the motion of the screw and nut under pressure. Such cam depending for the bearing upon the screws and upon the fitting of the screws into their respective nuts, by wear of the screws in their nuts and by warping soon became inoperative.

To obviate this, my invention consists in providing a step or bearing fitted and guided in the clamp, against which step the end of the said screw rests and is guided and held in the clamp against the step, and combined therewith a cam provided with a lever-handle and pivotally attached to the block, by which the desired final pressure can be readily applied with but little exertion on the part of the operator. The end of the screw fits into one of the blocks, so as to act as a guide and keep in proper contact with the cam without other guiding mechanisms.

The drawings show a pair of screw-clamps with this invention applied thereto, the step, cam, and lever being shown by drawing that end of the block in section.

1 and 2, respectively, represent the upper and lower jaws of a pair of clamps. Through the upper jaw 1, near the center of its length, passes a screw 3, resting with its shoulder 4 on the upper side of the jaw 1 and turning freely therein. The threaded portion of the screw 3 fits and turns in a female screw or nut formed in the lower jaw 2, near the center of its length. The screw 3 is provided with a head 5, by which it can be turned by hand. Near the end of the lower jaw is formed a nut or female screw, through which fits a screw 6, having a head 12 placed parallel with the screw 3 and of equal pitch therewith. Upon the upper end of the screw 6 rests a step 7, fitted in the jaw 1 so as to be capable of a rising-and-falling motion therein. Upon the top of the step 7 there is a cam 8, provided with a lever-handle 9 and turning on a pivot 10 in a bearing 11, secured to the upper side of the jaw 1.

The operation of the device is as follows: Two objects which are to be clamped together, as X and Y, being placed between the jaws 1 and 2, the screws 3 and 6 are turned in the direction indicated by the arrows upon the screw-heads 5 and 12 until the jaws 1 and 2 make a contact with the objects X and Y. The lever 9 is then turned to the position indicated by dotted lines in the figure, turning the cam 8 on the pivot 10 and pressing the step 7 against the screw 6, forcing open the rear end of the jaw and closing the jaws 1 and 2 tightly on the objects X and Y. A reverse movement of the lever 9 serves to loosen the clamp, and the screws can then be easily turned.

I am aware that clamps have been made wherein two blocks or jaws drawn together by a screw near the gripping end were forced apart by a screw passing through one jaw or block and bearing against a cam projecting inwardly from the other block at the other end, the blocks being held in proper relation to each other by a sliding guide. Such clamps are objectionable, on account of the failure of such guides to hold the screw, when warped or worn, in proper position to bear on the cam, and also on account of the expense of the guide, and are hereby disclaimed; but

What I claim is—

The clamp consisting of the parallel jaws 1 and 2, united by the screw 3, arranged to draw the jaws together at their central portion, and a screw 6, screwed through the jaw 2 and entering and guiding the jaw 1, and arranged to bear against the step 7, operated by the cam 8, substantially as shown and described.

JOHN G. FROELICH.

Witnesses:
J. DANIEL EBY,
ALEX. H. SIEGEL.